United States Patent [19]

Takahashi et al.

[11] 4,419,572

[45] Dec. 6, 1983

[54] CHECK DIGIT CALCULATOR

[75] Inventors: Mutsumi Takahashi, Kawasaki; Toshio Uwabe, Tokyo; Toshio Nagase, Yokohama; Shosuke Sato; Hideshi Matsuzawa, both of Tokyo, all of Japan

[73] Assignees: Tokyo Keiki Company Ltd.; Totec Co. Ltd., both of Tokyo, Japan

[21] Appl. No.: 196,134

[22] Filed: Oct. 10, 1980

Related U.S. Application Data

[62] Division of Ser. No. 955,236, Oct. 27, 1978, Pat. No. 4,272,674.

[30] Foreign Application Priority Data

Oct. 31, 1977 [JP] Japan ................................ 52-130406

[51] Int. Cl.[3] ...................... G06C 27/00; G01D 13/22

[52] U.S. Cl. ........................................ 235/69; 235/124

[58] Field of Search ................... 235/69, 71 R, 86, 65, 235/109, 117 A, 119, 124, 125

[56] References Cited

U.S. PATENT DOCUMENTS

| | | | |
|---|---|---|---|
| 349,459 | 9/1886 | Shattoch et al. | 235/71 R |
| 713,444 | 11/1902 | Johnson | 235/71 R |
| 983,682 | 2/1911 | Chfape | 235/71 R |
| 1,088,889 | 3/1914 | Falvey et al. | 235/86 |
| 1,619,230 | 3/1927 | Wright | 235/86 |
| 2,550,675 | 5/1951 | Curtis | 235/124 |
| 2,732,130 | 1/1956 | Rosenberg | 235/71 R |
| 2,950,048 | 8/1960 | Luhn | 235/71 R |
| 3,281,071 | 10/1966 | Curran | 235/71 R |
| 3,785,553 | 1/1974 | Brown | 235/71 R |

FOREIGN PATENT DOCUMENTS

| | | |
|---|---|---|
| 693723 | 7/1953 | United Kingdom . |
| 1065230 | 4/1967 | United Kingdom . |
| 1125293 | 8/1968 | United Kingdom . |
| 1232861 | 5/1971 | United Kingdom . |
| 1352129 | 5/1974 | United Kingdom . |
| 1393502 | 5/1975 | United Kingdom . |

*Primary Examiner*—Benjamin R. Fuller
*Attorney, Agent, or Firm*—Michael N. Meller; Anthony H. Handal

[57] ABSTRACT

There is provided a calculator for calculating check digits which are obtained from code numbers according to a modulus 10, modulus 11 or the like check. In accordance with one embodiment of the invention, the desired check digit original numerals are indicated in response to the determination of a code number and weights and the desired check digit is readily obtained from the sum of the check digit original numerals. In accordance with another embodiment, the desired check digit is directly indicated in response to the setting of a code number. In accordance with still another improved embodiment, the desired check digit according to the modulus 10 and that according to the modulus 11 are selectively indicated in response to the setting of a code number.

3 Claims, 34 Drawing Figures

CHECK DIGIT CALCULATOR

This is a division of application Ser. No. 955,236 filed Oct. 27, 1978 now U.S. Pat. No. 4,272,674.

BACKGROUND OF THE INVENTION

The present invention relates to calculators for calculating check digits which are obtained from code numbers, and more particularly the invention relates to a check digit calculator capable of obtaining the desired check digits according to a modulus 10 and modulus 11 check, respectively, through a mechanical operation.

Generally, a check digit is a number calculated from the numerical value of each code number, and it is affixed to the least significant digit of the code number for the purpose of automatically detecting a coding error. In other words, a check digit is appended to an important key number such as an account number or customer code number so as to prevent the occurrence of an error such as a wrong account number. The known methods of calculating check digits include a modulus 10 check represented by the Luhn's check and adapted to use various combinations of weights as well as a modulus 11 check, 9′ check, 7′ check, etc., which similarly use various combinations of weights.

In the past, a check digit has been calculated from each code number in accordance with a predetermined calculating formula by using predetermined weights, and it has been necessary to perform arithmetic operations on each of the digits in each code number, thus requiring much time and labor for the calculation of the check digit. Of course, it is possible to program or enter a check digit computing process into a computer so that the printing of each code number is accompanied by the printing of an associated check digit. However, the use of a computer system only for the purpose of calculating check digits has a great economic demerit and there is a very limited possibility of its practical use.

SUMMARY OF THE INVENTION

It is an object of the present invention to provide a check digit calculator in which the desired check digit numeral can be easily obtained within a short period of time by setting a code number and weights.

It is another object of the invention to provide a calculator in which the desired check digit is obtained from the check digit original numerals obtained from a code number in accordance with a predetermined modulus and weights.

It is another object of the invention to provide a check digit calculator including a plurality of movable members, each having indicated thereon a code number setting digit group, a weight and a check digit original numeral digit group.

It is still another object of the invention to provide a check digit calculator in which a slide indicating plate is moved to selectively indicate the check digit original numerals according to different combinations of weights in response to the setting of a code number.

It is still another object of the invention to provide a check digit calculator in which the desired check digit numeral according to predetermined weights is directly indicated in response to the setting of a code number.

It is still another object of the invention to provide a check digit calculator in which both the desired check digit according to the modulus 10 and that according to the modulus 11, with predetermined weights, can be indicated simultaneously in response to the setting of a code number.

It is still another object of the invention to provide a check digit calculator in which by selectively using a plurality of code number sheets each having indicated thereon a plurality of code number digit group corresponding to a combination of weights, the desired check digits according to the modulus 10 as well as the modulus 11 with all the possible combinations of weights can be selectively indicated.

Further objects, features and advantages of the invention will appear more fully from the following description.

DESCRIPTION OF THE PREFERRED EMBODIMENTS

Firstly, preferred embodiments of the invention will be described with reference to a check digit calculator in which each ten check digit original numeral corresponding to each ten code number setting digit is preliminarily calculated according, for example, to the modulus 10 or 11 and predetermined weights, and a desired number of movable members each having formed thereon such digits are prepared. The movable members are mounted in the same fixed member so as to be movable independent of one another, and the fixed member is formed with at least one indicating window so that a selected one of the code number digits and its associated check digit original numerals formed on each movable member are indicated in corresponding relation at the window.

Figure 1:
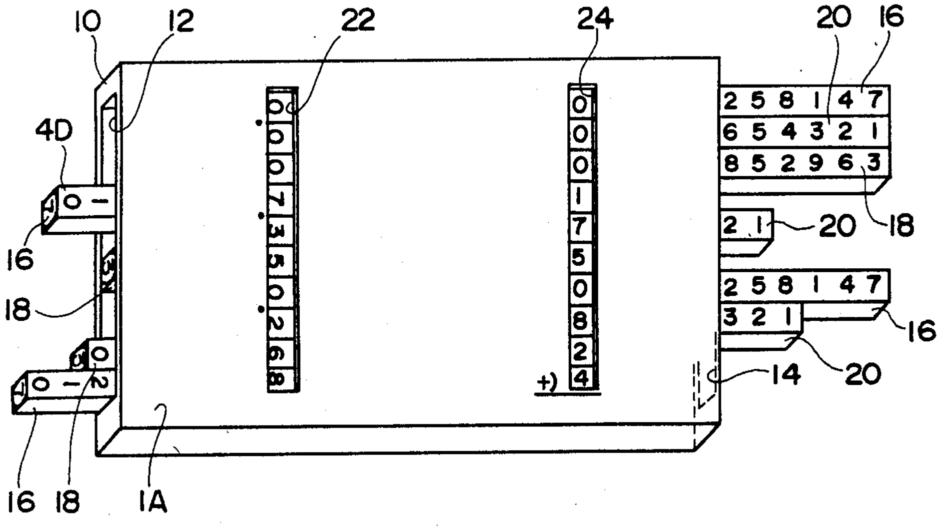
FIG. 1 is a perspective view showing an embodiment of a check digit calculator according to the invention employing check digit original numerals.
Figure 2:
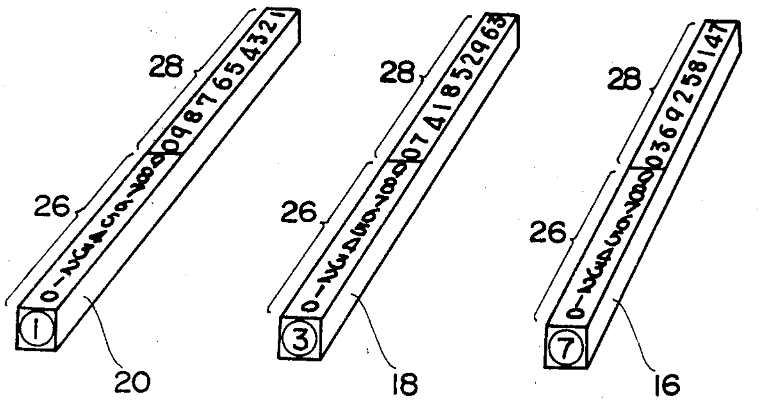
FIG. 2 is a perspective view showing three different slide bars used with the embodiment of FIG. 1.

Referring now to FIG. 1, there is illustrated a first embodiment of a calculator according to the invention which calculates a check digit for a ten-digit code number according to a modulus 10, weights 1, 3, 7 check. In the figure, numeral 10 designates a case formed with openings 12 and 14 at its ends and constituting a calculator case proper. A total of ten slide bars including three different types of slide bars or movable members 16, 18 and 20 are mounted slidably inside the case 10. Two windows 22 and 24 are formed in the surface of the case 10 with a predetermined space therebetween. The three different types of slide bars 16, 18 and 20 are shown in FIG. 2, and each slide bar is formed on its upper surface with 20 digits in which a digit group 26 consists of code number setting digits and a digit group 28 consists of check digit original numerals. The numerals 7, 3 and 1 shown respectively on the ends of the slide bars 16, 18 and 20 are weights. As a result, the individual digits in a code number are indicated at the window 22 of the case 10 and the check digit original numerals positioned eleventh from the indicated code number digits appear at the other window 24.

The digit group 28 arranged on each of the slide bars 16, 18 and 20 will now be described. According to the modulus 10 check and the modulus 11 check, respectively, if a code number is $C_n \ldots C_2\, C_1$ and weights are $W_n \ldots W_2\, W_1$, then a check digit can be obtained in the following way:

Modulus 10:

$$\begin{array}{l} C_n \ldots C_2\ C_1 \\ \times \ \ldots \times\ \times \\ \underline{W_n \ldots W_2\ W_1} \\ C_nW_n + \ldots + C_2W_2 + C_1W_1 = \text{sum} \\ \text{sum} \div 10 = \text{quotient} \text{ - - - remainder} \\ 10 - \text{remainder} = \text{check digit} \end{array}$$

In the case of a Luhn's check or modulus 10, weights 1, 2, 1, 2 check, however, if the resulting $C_n\, W_n, \ldots C_2\, W_2, C_1\, W_1$ are two figures, the addition is effected separately on each of the units places and each of the tens places.

Modulus 11:

$$\begin{array}{l} C_n \ldots C_2\ C_1 \\ \times \ \ldots \times\ \times \\ \underline{W_n \ldots W_2\ W_1} \\ C_nW_n + \ldots + C_2W_2 + C_1W_1 = \text{sum} \\ \text{sum} \div 11 = \text{quotient} \text{ - - - remainder} \\ 11 - \text{remainder} = \text{check digit} \end{array}$$

For example, in a modulus 10, weights 1, 3, 7 check, the check digit associated with a code number 467843 is given as follows:

$$\begin{array}{ll} \text{Code number} & 4\ \ 6\ \ 7\ \ 8\ \ 4\ \ 3 \\ & \times\ \times\ \times\ \times\ \times\ \times \\ & \underline{1\ \ 3\ \ 7\ \ 1\ \ 3\ \ 7} \\ & 4 + 18 + 49 + 8 + 12 + 21 = 112 \end{array}$$

$$\begin{array}{l} 112 \div 10 = 11 \text{ - - - remainder 2} \\ 10 - 2 = 8 \quad \text{ - - - check digit} \end{array}$$

On the other hand, the inventors have discovered that the desired check digit numerals can be calculated by a different method. This method utilizes check digit original numerals. Here, the check digit original numerals are digits obtained from the following equations (1), (2) and (3) performed in this order:

$$\left.\begin{array}{l} C_n \ldots C_2\ C_1 \\ \times \ \ldots \times\ \times \\ \underline{W_n \ldots W_2\ W_1} \\ C_nW_n \ldots C_2W_2\ C_1W_1 \end{array}\right\} (1)$$

$$\left.\begin{array}{l} C_nW_n \div 10 \text{ or } 11 = \text{quotient}_n \\ \quad\vdots \\ C_2W_2 \div 10 \text{ or } 11 = \text{quotient}_2 \\ C_1W_1 \div 10 \text{ or } 11 = \text{quotient}_1 \end{array}\right\} (2)$$

-continued $$\left.\begin{array}{l} 10 \text{ or } 11 - \text{quotient}_n = (C/D)_n \\ \quad \cdot \quad \cdot \quad \cdot \\ \quad \cdot \quad \cdot \quad \cdot \\ \quad \cdot \quad \cdot \quad \cdot \\ 10 \text{ or } 11 - \text{quotient}_2 = (C/D)_2 \\ 10 \text{ or } 11 - \text{quotient}_1 = (C/D)_1 \end{array}\right\} \quad (3)$$

Thus, from the above equations (1) to (3) the check digit original numerals for the code number 467843 are given as 6, 2, 1, 2, 8 and 9.

A check digit can be obtained from these check digit original numerals by performing the following operations $$(C/D)_n + \ldots + (C/D)_2 + (C/D)_1 = \text{sum}$$

$$\text{Sum} \div (10 \text{ or } 11) = \text{quotient} \text{ - - - remainder}$$

The remainder is the desired check digit. For example, the sum of the check digit original numerals for the code number 467,843 is 28, and the remainder obtained by dividing the number by 10 is 8 which is equal to the result obtained by the ordinary calculating method.

The check digit original numerals used with this novel method can each be put into the form of a diagram for each code number digit by predetermining a weight as shown in the following Table 1.

TABLE 1

| | Code number digit | | | | | | | | | |
|---|---|---|---|---|---|---|---|---|---|---|
| Weight | 0 | 1 | 2 | 3 | 4 | 5 | 6 | 7 | 8 | 9 |
| 1 | 0 | 9 | 8 | 7 | 6 | 5 | 4 | 3 | 2 | 1 |
| 2 | 0 | 8 | 6 | 4 | 2 | 0 | 8 | 6 | 4 | 2 |
| 3 | 0 | 7 | 4 | 1 | 8 | 5 | 2 | 9 | 6 | 3 |
| 4 | 0 | 6 | 2 | 8 | 4 | 0 | 6 | 2 | 8 | 4 |
| 5 | 0 | 5 | 0 | 5 | 0 | 5 | 0 | 5 | 0 | 5 |
| 6 | 0 | 4 | 8 | 2 | 6 | 0 | 4 | 8 | 2 | 6 |
| 7 | 0 | 3 | 6 | 9 | 2 | 5 | 8 | 1 | 4 | 7 |
| 8 | 0 | 2 | 4 | 6 | 8 | 0 | 2 | 4 | 6 | 8 |
| 9 | 0 | 1 | 2 | 3 | 4 | 5 | 6 | 7 | 8 | 9 |

Of course, in the case of the modulus 11 the check digit original numerals corresponding to the code number digits and weights can be similarly put into the form of a diagram.

The three types of slide bars 16, 18 and 20 shown in FIG. 2 each has the digit group 28 consisting of a sequence of digits representing the check digit original numerals determined by one of the weights in Table 1. In this case, the code number indicating digit group 26 is arranged in a direction different from that of the digit group 28 for indicating check digit original numerals to distinguish the two groups from each other. Of course, the two groups may be painted in different colors for distinguishing purposes.

Next, the operation of the calculator according to the embodiment of FIG. 1 will be described with reference to the case of a modulus 10, weights 1, 3, 7 check. Firstly, the slide bars are moved so that the desired code number appears at the window 22. When the code number is set at the window 22, the check digit original numerals appearing simultaneously at the window 24 are added and the digit in the units place of the sum or the numerical value of the remainder obtained when the sum is divided by 10 serves as the check digit. More specifically, with a code number 0007350268 set at the window 22 in FIG. 1, the sum of the check digit original numerals 0001750824 appearing at the window 24 at this time is 27, and consequently it will readily be seen that the corresponding check digit is 7.

Figure 3:
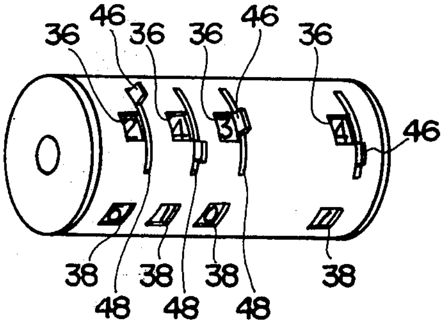
FIG. 3 is a perspective view showing a second embodiment of the calculator according to the invention employing check digit original numerals.
Figure 4:
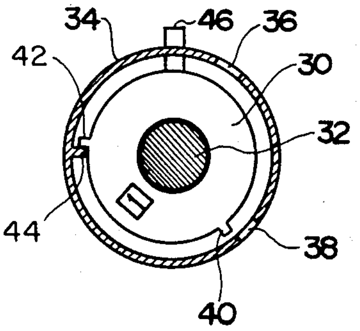
FIG. 4 is a longitudinal sectional view of FIG. 3.

FIG. 3 shows a second embodiment of the invention which differs from the embodiment of FIG. 1 in that the slide bars are replaced with disk rotary members. FIG. 4 shows a longitudinal sectional view of FIG. 3, and a plurality of rotary members 30 of the same size are rotatably mounted on a shaft 32. Each rotary member 30 is formed on its peripheral surface with a code number indicating digit group and another digit group representing the check digit original numerals determined for a desired weight according to Table 1, and these digits are arranged at equal spaces within a central angle of 240°. The rotary members 30 are housed within a cylindrical case 34, and a pair of windows 36 and 38 are formed for each rotary member 30 at positions which are spaced apart by 120° in terms of central angle. The windows 36 indicate check digit original numerals and the windows 38 indicate each code number. Two projections 40 and 42 are respectively provided at one end of the digit groups formed on the outer periphery of each rotary member 30, so that the projections 40 and 42 are each adapted to abut against a stopper 44 provided inside the case 34 and consequently the rotational angle of the rotary member 30 is limited to 120°. A lever 46 is extended from one side of each rotary member 30 to the outside through one of slits 48 formed in the case 34, and it is possible to set a desired code number at the windows 38 by moving the levers 46. The calculator shown in FIG. 3 is used in the same manner as that of FIG. 1, that is, it is only necessary to set a desired code number at the windows 38 by moving the levers 46 and to use as a check digit the least significant digit in the sum of the check digit original numerals appearing at the windows 36 at this time.

Figure 5:
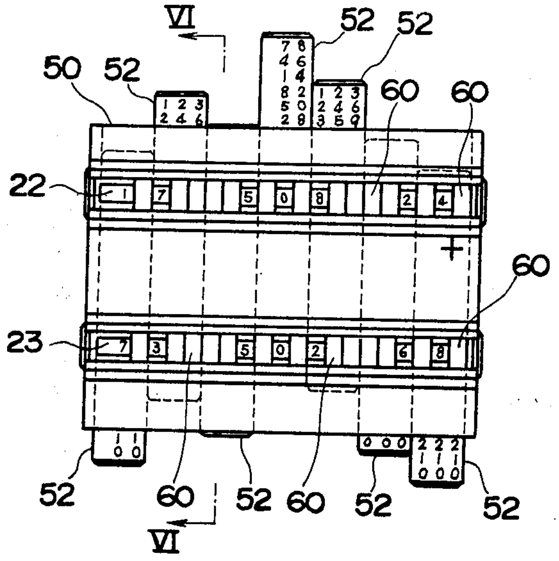
FIG. 5 is a perspective view showing a third embodiment of the calculator according to the invention employing check digit original numerals.
Figure 6:
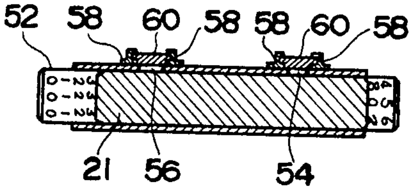
FIG. 6 is a sectional view taken along the line I—I of FIG. 5.
Figure 7:
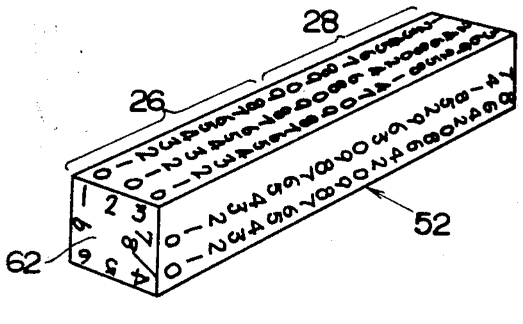
FIG. 7 is a perspective view showing one of the slide bars used with the embodiment of FIG. 5.

FIG. 5 shows still another embodiment of the calculator in which each slide bar or movable member is formed with all the digit groups for the check digit original numerals corresponding to the weights shown in Table 1, and a shutter is provided for each code number and check digit original numeral indicating windows to select any desired weight. More specifically, seven slide bars 52 are slidably mounted within a case 50, and the case 50 is formed in the surface upper portion with a check digit original numeral indicating window 54 and in the surface lower portion with a code number indicating window 56. As will be seen from the longitudinal sectional view of FIG. 6, a guide rail 58 is provided on each side of the windows 54 and 56, and a plurality of shutter pieces 60 are movably fitted to the guide rails 58. FIG. 7 shows one of the slide bars 52 used with the embodiment of FIG. 5 which is in the form of a rectangular bar having a square shape in cross section, and its end face 62 is depicted with digits indicating the weights. Code number indicating digit groups 26 and check digit original numeral indicating digit groups 28 are depicted on the longitudinal faces of the slide bar 52 in correspondence with the weights. The slide bars 52 are fitted in the case 50 in such a manner that the weights on the end faces 62 used appear on the top.

The calculator shown in FIG. 5 is used in the following manner. The unnecessary digits on the slide bars 52 are hidden by the shutter pieces 60 in such a manner that the digits in the columns corresponding to the weights used appear at the windows 54 and 56. Then, the desired code number is set at the window 56 and the sum of the check digit original numerals appearing at the window 54 is obtained. The least significant digit of the resulting sum is the desired check digit.

Figure 8:
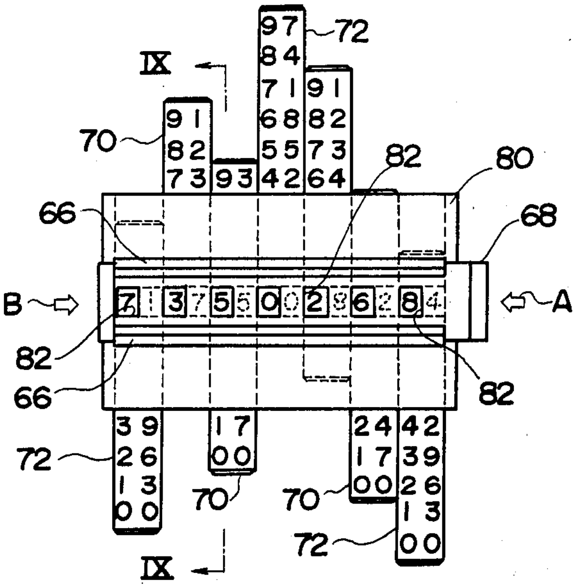
FIG. 8 is a perspective view of a fourth embodiment of the calculator according to the invention employing check digit original numerals.
Figure 9:
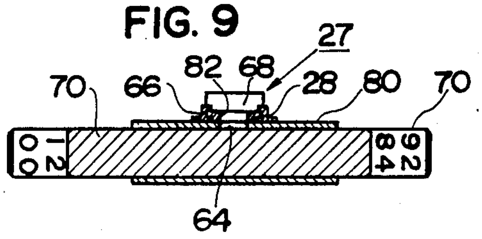
FIG. 9 is a sectional view taken along the line II—II of FIG. 8.
Figure 10:
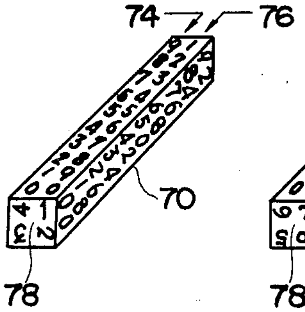
FIG. 10 is a perspective view showing one of the slide bars used with the embodiment of FIG. 8.
Figure 11:
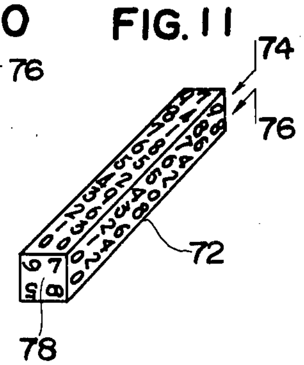
FIG. 11 is a perspective view showing other one of the bars used with the embodiment of FIG. 8.

FIG. 8 shows still another embodiment employing check digit original numerals. As will be seen from the sectional view of FIG. 9, there is provided a single window 64, and a slide indicating plate 68 having a plurality of windows 82 arranged at predetermined spaces is moved along a pair of guide rails 66 provided on both sides of the window 64 so as to selectively indicate the code numbers and the corresponding check digit original numerals. As a result, as shown in FIGS. 10 and 11, slide bars 70 and 72 are each provided on each of the longitudinal faces with a code number digit group 74 and a check digit original numeral digit group 76, which are depicted in parallel, and weights are depicted on an end face 78. The calculator according to the embodiment of FIG. 8 is used in the following way. Firstly, the slide bars 70 and 72 are fitted in a case 80 in such a manner that the weights used appear on the top, and the slide indicating plate 68 is moved to a position such as shown in the figure, thus setting a desired code number at its windows 82. The slide indicating plate 68 is then moved to the right to indicate the check digit original numerals shown by the dotted lines, and the sum of the check digit original numerals is produced to use its least significant digit as the desired check digit.

Figure 12:
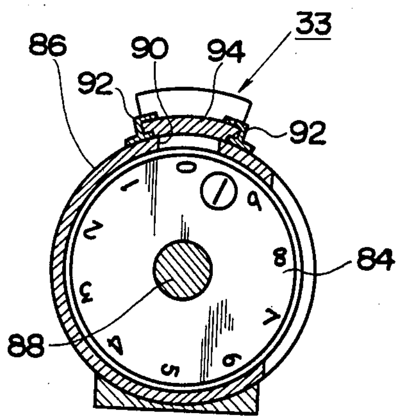
FIG. 12 is a perspective view showing a fifth embodiment of the invention employing check digit original numerals.
Figure 13:
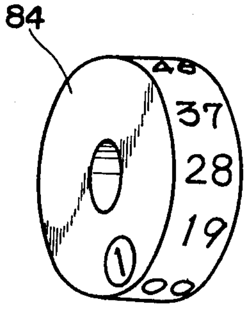
FIG. 13 is a perspective view showing one of the rotary members used with the embodiment of FIG. 12.

FIG. 12 shows still another embodiment which differs from the embodiment of FIG. 8 in that the slide bars are replaced with rotary members 84 and the case is in the form of a cylindrical case 86 in which the rotary members 84 are rotatably mounted on a shaft 88. The case 86 is formed with a window 90 which is opened axially, and provided on both sides of the window 90 are a pair of guide rails 92 on which is slidably mounted a slide indicating plate 94 of the same construction as the counterpart in the embodiment of FIG. 8. FIG. 13 shows one of the rotary members 84 used in the embodiment of FIG. 12, in which the peripheral surface is depicted with code number digits and digits for check digit original numerals arranged in two rows and one side is depicted with a digit indicative of a weight. The operation of the calculator shown in FIG. 12 will be readily understood from that of the embodiment shown in FIG. 8.

Next, a check digit calculator in which the desired check digit is directly indicated in response to the setting of each code number will be described.

Figure 14:
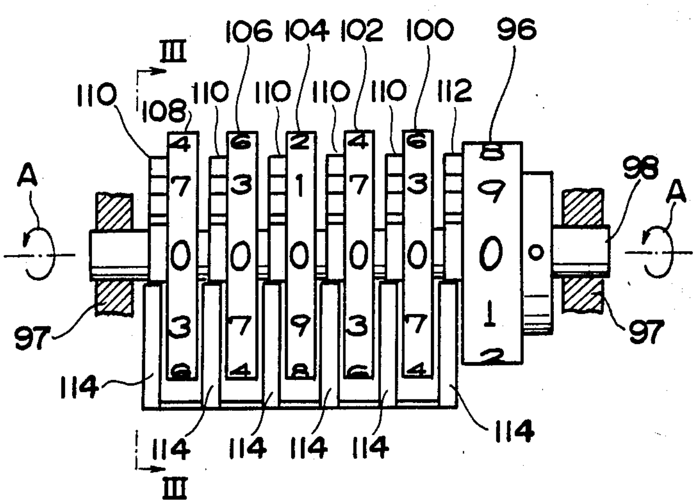
FIG. 14 is a front view showing a sixth embodiment of the invention in which each check digit is indicated directly.

FIG. 14 shows the internal construction of a calculator according to still another embodiment of the invention in which the desired check digit is directly indicated in response to the setting of each code number. Fixedly mounted on a rotating shaft 98 mounted in bearings 97 is a rotary indicator 96 which is depicted with digits 0, 1, 2, 3, 4, 5, 6, 7, 8 and 9 arranged at intervals of 36° to indicate the check digits according to the modulus 10. Also rotatably mounted on the shaft 98 are five dials 100, 102, 104, 106 and 108 which are each depicted with ten code number indicating digits which are arranged at equal spaces, and the dials 100, 102, 104, 106 and 108 are each provided with an integral ratchet wheel 110 having ten external teeth and ten internal teeth. The rotary indicator 96 is also provided with a ratchet wheel 112 which is integral therewith and has ten external teeth. A detent piece 114 is engaged with the ratchet wheel 110 of each of the dials 100, 102, 104, 106 and 108 and the ratchet wheel 112 of the rotary indicator 96, and consequently the dials and the rotary indicator are each adapted to rotate in one direction only.

Figure 15:
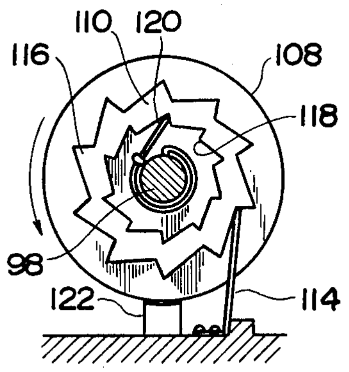
FIG. 15 is a sectional view taken along the line III—III of FIG. 14.

Referring to FIG. 15 showing the section taken along the line III—III of FIG. 14, the ratchet wheel 110 of the dial 108 includes external teeth 116 adapted for engagement with the detent piece 114 and internal teeth 118. Since the detent piece 114 is adapted for engagement with the external teeth 116, the dial 108 is rotatable only in the counterclockwise direction shown by the arrow. On the other hand, the internal teeth 118 are adapted for engagement with a stopper spring 120 having its one end fastened to the shaft 98, so that when the dial 108 is rotated counterclockwise, the shaft 98 is also rotated along with the dial 108 and consequently the check digit indicating rotary indicator 96 fixedly mounted on the shaft 98 is rotated. On the other hand, a brake member 122 is disposed in sliding contact with the lower periphery of the dial 108 so as to produce a suitable frictional force when the dial 108 is rotated. The other dials 100, 102, 104 and 106 are of the same construction as shown in FIG. 15.

With the embodiment shown in FIG. 14, the arrangements of code number digits depicted on the dials 100, 102, 104, 106 and 108 for setting a code number will now be described.

The inventors have discovered that by specifying a weight in the Luhn's check or modulus 10 check, for example, a relationship as shown in Table 2 or 3 is obtained between the respective digits (single figure numerical values) constituting each code number and the check digits.

TABLE 2

| | Luhn's Check (Modulus 10, Weights 1, 2 Check) | | | | | | | | | |
|---|---|---|---|---|---|---|---|---|---|---|
| | Check digit | | | | | | | | | |
| Weight | 0 | 1 | 2 | 3 | 4 | 5 | 6 | 7 | 8 | 9 |
| 1 | 0 | 9 | 8 | 7 | 6 | 5 | 4 | 3 | 2 | 1 |
| 2 | 0 | 9 | 4 | 8 | 3 | 7 | 2 | 6 | 1 | 5 |

TABLE 3

| | Modulus 10 | | | | | | | | | |
|---|---|---|---|---|---|---|---|---|---|---|
| | Check digit | | | | | | | | | |
| Weight | 0 | 1 | 2 | 3 | 4 | 5 | 6 | 7 | 8 | 9 |
| 1 | 0 | 9 | 8 | 7 | 6 | 5 | 4 | 3 | 2 | 1 |
| 2 | 5 | | 4 | | 3 | | 2 | | 1 | |
| | 0 | | 9 | | 8 | | 7 | | 6 | |
| 3 | 0 | 3 | 6 | 9 | 2 | 5 | 8 | 1 | 4 | 7 |
| 4 | 5 | | 2 | | 4 | | 1 | | 3 | |
| | 0 | | 7 | | 9 | | 6 | | 8 | |
| 5 | 2, 4 | | | | | 1, 3 | | | | |
| | 0 | | | | | 9 | | | | |
| | 6, 8 | | | | | 5, 7 | | | | |
| 6 | 5 | | 3 | | 1 | | 4 | | 2 | |
| | 0 | | 8 | | 6 | | 9 | | 7 | |
| 7 | 0 | 7 | 4 | 1 | 8 | 5 | 2 | 9 | 6 | 3 |
| 8 | 5 | | 1 | | 2 | | 3 | | 4 | |
| | 0 | | 6 | | 7 | | 8 | | 9 | |
| 9 | 0 | 1 | 2 | 3 | 4 | 5 | 6 | 7 | 8 | 9 |

For example, in a modulus 10, weights 1, 3, 7 check, the following sequences of code number digits will be obtained from the Table 3:

Dial of weight 7: 0, 7, 4, 1, 8, 5, 2, 9, 6, 3

Dial of weight 3: 0, 3, 6, 9, 2, 5, 8, 1, 4, 7

Dial of weight 1: 0, 9, 8, 7, 6, 5, 4, 3, 2, 1

As a result, with the embodiment of FIG. 14 used for indicating the check digits according to the modulus 10, weights 1, 3, 7 check, the dials 100 and 106 each have the digit arrangement or group corresponding to the weight 7, the dials 102 and 108 are each provided with the digit group corresponding to the weight 3, and the dial 104 is provided with the digit group corresponding to the weight 1.

For the calculator shown in FIG. 14, the check digit indicating operation will now be described. Assuming now that a code number is 67843, the corresponding check digit 2 will be obtained from the ordinary method of calculation. Now, let us try to set the code number 67843 by the dials to indicate the corresponding check digit. Of course, the mechanism of FIG. 14 is mounted in the case so as to indicate the digits in a row at the window.

Initially, the dials are each set to 0 and the corresponding check digit is 0. Then, the dial 100 is rotated and the units place code number digit 3 is set. When this occurs, the dial 100 is rotated 9/10 of a revolution. This also rotates the rotary indicator 96 9/10 of a revolution and a check digit 9 is indicated. At this time, the other dials are not rotated. Next, the dial 102 is rotated so that the tens place code number digit 4 is set. In this case, the dial 102 is rotated 8/10 of a revolution and consequently the rotary indicator 96 is also rotated 8/10 of a revolution and a check digit 7 is indicated. This 7 is the check digit for a code number 43.

In the like manner, when the code number digit 8 is set by rotating the dial 104 2/10 of a revolution, the rotary indicator 96 is also rotated 2/10 of a revolution and a check digit 9 corresponding to a code number 843 is indicated. When the dial 106 is rotated 1/10 of a revolution to set the code number digit 7, the rotary indicator 96 is also rotated 1/10 of a revolution and a check digit 0 corresponding to a code number 7843 is indicated. Lastly, when the dial 108 is rotated 2/10 of a revolution to set the code number digit 6, the rotary indicator 96 is also rotated 2/10 of a revolution and the check digit 2 corresponding to the code number 68743 is indicated. The result coincides with the check digit obtained with the ordinary method of calculation, thus showing that with the embodiment of FIG. 14 the desired check digit can be directly indicated by setting each code number. While this embodiment is designed to indicate a check digit of a five-digit code number in the modulus 10, weights 1, 3, 7 check, the number of dials may be increased so as to increase the number of digits in each code as desired, and the indication of check digits can be effected by means of a similar mechanism not only in the Luhn's check according to Table 2 or the modulus 10 check with any combinations of the weights shown in Table 3 but also in other 9's check and modulus 11 checks.

Figure 16:
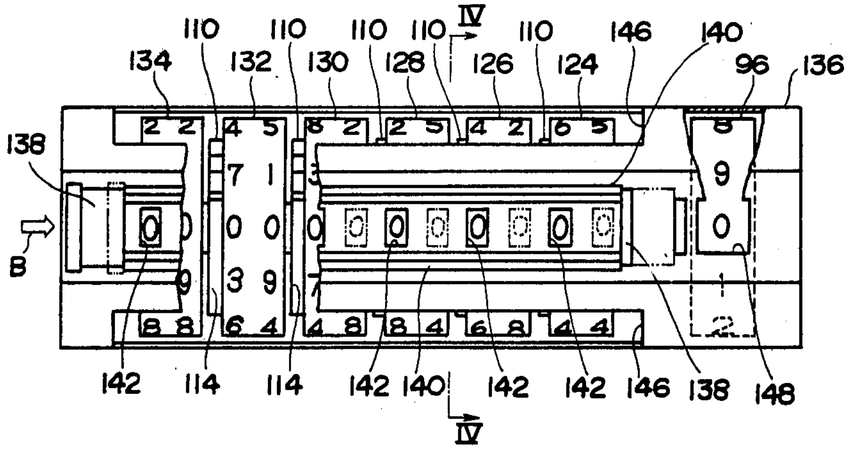
FIG. 16 is a front view of a seventh embodiment of the invention in which each check digit is directly indicated.
Figure 17:
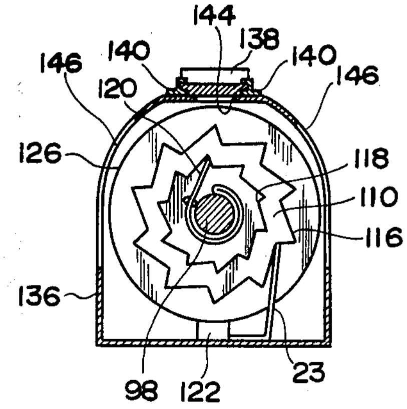
FIG. 17 is a sectional view taken along the line IV—IV of FIG. 16.

FIG. 16 shows still another embodiment of the invention which differs from the calculator of FIG. 14 in that dials 124, 126, 128, 130, 132 and 134 are each provided with two rows of code number digits corresponding to different weights, and a drive unit for these dials and rotary indicator 96 is identical with the counterpart in the embodiment of FIG. 14. Another difference from the embodiment of FIG. 14 is that a slide indicating plate 138 is provided along a pair of guide rails 140 in the code number indicating section of a case 136. The slide indicating plate 138 is formed with a plurality of windows 142 which are arranged at predetermined spaces. FIG. 17 is a sectional view taken along the line IV—IV of FIG. 16, and the slide indicating plate 138 is slidably fitted on the guide rails 140 which are provided on both sides of a window 144 of the case 136. An opening 146 is provided on each side of the case 136.

The calculator shown in FIG. 16 is used in the following way. One or the other of the two code number digit arrangements depicted on each dial according to two different weights is selected by adjusting the positions of the windows 142 in the slide indicating plate 138 and then a desired code number is set at the selected windows 142. When this occurs, the rotary indicator 96 indicates the corresponding check digit at its window 148.

Next, a calculator according to still another embodiment of the invention will be described in which drive means for indicating the desired check digit upon setting each code number is in the form of an endless belt or wire.

Figure 18:
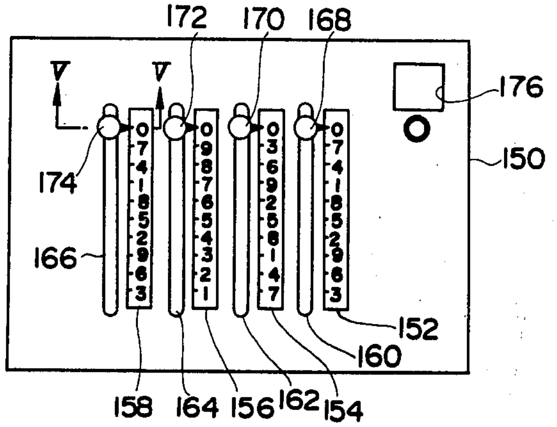
FIG. 18 is an eighth embodiment of the invention in which each check digit is indicated directly.

Referring now to FIG. 18 showing a plan view of a calculator proper, a plurality of code number panels 152, 154, 156 and 158 which are each depicted with a sequence of code number digits, are arranged at predetermined spaces on the surface of a case 150. Slits 160, 162, 164 and 166 are respectively formed in the surface of the case 150 on one side of the code number panels 152, 154, 156 and 158, and slidable code number setting knobs 168, 170, 172 and 174 are respectively fitted in the slits. The case 150 is also formed with a window 176 and a check digit is indicated at the window 176.

Figure 22:
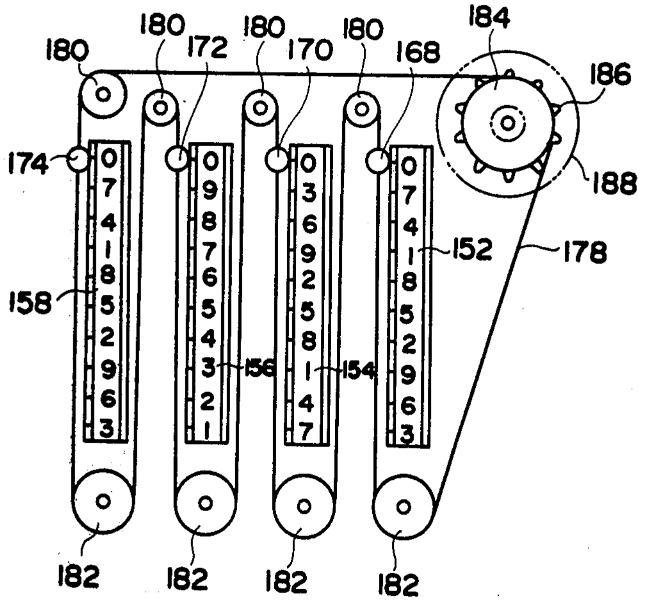
FIG. 22 is a schematic plan view showing the internal construction of the embodiment shown in FIG. 18.
Figure 23:
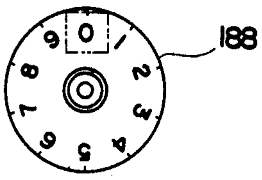
FIG. 23 is a plan view of the check digit rotary indicator shown in FIG. 22.

In FIG. 22 showing the drive unit for the internal mechanism of the embodiment shown in FIG. 18, there are provided four pairs of pulleys 180 and 182 to extend an endless belt 178 along the code number panels 152, 154, 156 and 158 so that the knobs 168, 170, 172 and 174 may each be depressed to connect it with the belt 178, and the belt 178 is also passed around a sprocket pulley 184. The sprocket pulley 184 is formed on its outer periphery with ten projections 186 which are adapted to fit into the holes formed in the belt 178 at equal spaces so as to prevent slipping of the belt 178. Also a check digit rotary indicator 188 shown in FIG. 23 is fixedly mounted on the sprocket pulley 184.

Figure 19:
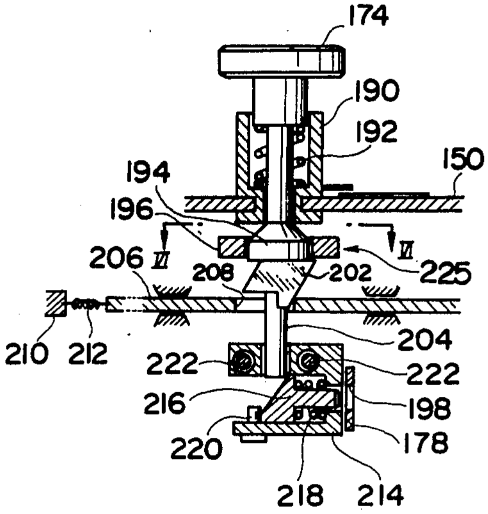
FIG. 19 is a sectional view taken along the line V—V of FIG. 18.
Figure 20:
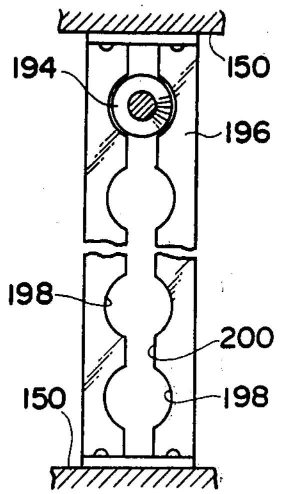
FIG. 20 is a sectional view taken along the line VI—VI of FIG. 19.

Referring now to FIG. 19 showing a sectional view taken along the line V—V of FIG. 18, there is illustrated a structure for connecting the guide means of the code number setting knobs and the belt. The knob 174 is inserted through the intermediary of a coiled spring 192 into a guide cylinder 190 fixedly mounted in the case 150, and a plurality of holes 198 in a guide plate 196 shown in FIG. 20 are positioned below a flange 194 at the lower end of the knob 174. In FIG. 20 showing a sectional view taken along the line VI—VI of FIG. 19, the guide plate 196 is formed with a longitudinal slit 200 and the ten holes 198 arranged at the same spaces as the digits on the code number indicating panel 158 shown in FIG. 18, and the flange 194 is adapted to pass through the guide plate 196 at the position of the holes 198.

Figure 21:
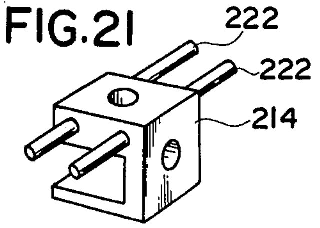
FIG. 21 is a perspective view showing a movable block constituting a part of the belt locking unit used in the embodiment of FIG. 18.

Referring again to FIG. 19, disposed below the lower surface of the flange 194 of the knob 174 is a press pin 204 having a press cam plate 202 fixedly mounted on the top thereof, and the press cam plate 202 has its right side pressed against a slit 208 in a set plate 206. The set plate 206 is secured to a fixed frame 210 by a spring 212, so that when the knob 174 is depressed, the set plate 206 is moved to the right by the downward movement of the cam plate 202, and when the depression on the knob 174 is released, the set plate 206 is returned by the spring 212, thus moving the cam plate 202 upward. The lower part of the press pin 204 is fitted into a movable block 214 shown in FIG. 21, and a transversely movable moving pin 216 is held between a spring 218 and a stop screw 220 and mounted within the block 214. Consequently, when the press pin 204 is moved downward, the moving pin 216 slides to the right and the forward end of the pin 216 is extended through the side wall of the block 214. The belt 178 is extended around the side of the block 214 and consequently the projected moving pin 216 is fitted in the hole 198 of the belt 178. In other words, when the knob 174 is depressed, the knob 174 is held in a locked relation with the belt 178, so that when in this condition the knob 174 is slid, the belt 178 is moved along with the knob 174. The block 214 is provided with a pair of guide rails 222 which extend through it and consequently the block 216 is moved along the guide rails 222 together with the knob 174. The other knobs 168, 170 and 172 shown in FIG. 18 are each provided with the same structure as shown in FIGS. 19, 20 and 21.

As regards the code number digit groups depicted on each of the code number indicating panels 152, 154, 156 and 158 shown in FIG. 18, in the Luhn's check the two different digit groups shown in Table 2 may be used, and in the modulus 10 check any desired digit group corresponding to the weights shown in Table 3 may be used. With the embodiment of FIG. 18, the code number digit groups according to the modulus 10, weights 1, 3, 7 check are used. In other words, the code number digit group corresponding to the weight 7 is depicted on each of the units and thousands code number indicating panels 152 and 158, respectively the code number digit group corresponding to the weight 3 is depicted on the tens code number indicating panel 154, and the code number digit group corresponding to the weight 1 is depicted on the hundreds code number indicating panel 156.

The operation of the calculator shown in FIG. 18 will now be described with reference to the case of the modulus 10, weights 1, 3, 7 check.

The code number setting knobs 168, 170, 172, and 174 are respectively set to the position of the digit 0 on the code number indicating panels 152, 154, 156 and 158. When this occurs, the check digit at the window 176 is also changed to 0. Let us, for example, obtain the check digit for a code number 4753. Firstly, the code number setting knob 174 is depressed and the moving pin 216 is fitted in the hole 198 of the belt 178 by the structure shown in FIG. 19. Then, the code number setting knob 174 is slid in its depressed condition and the depression is released after it has been set to the code number digit 4. In this case, since the code number digit 4 is indicated at the third position from the digit 0, the belt 178 is moved by an amount equal to this distance. Since the spacing of the digits on the code number indicating panel 158 is equal to the spacing of the projections on the sprocket pulley 184 as shown in FIG. 22, the check digit rotary indicator 188 shown in FIG. 23 is rotated 2/10 of a revolution in the counterclockwise direction and a check digit 2 is indicated. In the like manner, the code number setting knobs 172, 170 and 168 are successively depressed and slid to stop at the positions of the code number digits 7, 5 and 3, respectively. When this occurs, due to the movement of the belt 178 in response to the setting of the hundreds code number digit 7, the rotary indicator 188 is rotated 3/10 of a revolution and a check digit 5 is indicated. The next setting of the tens code number digit 5 further rotates the rotary indicator 188 5/10 of a revolution and a check digit 0 is indicated. The final setting of the units code number digit 3 rotates the rotary indicator 188 9/10 of a revolution and a check digit 9 is indicated. This 9 is the desired check digit for the code number 4573 in the modulus 10, weights 1, 3, 7 check.

With the Luhn's check, it is only necessary to use the code number indicating panels depicted with the digit groups corresponding to the weights 1 and 2 in Table 2. With other modulus 10 checks using different weights, it is only necessary to select the corresponding code number digit groups shown in Table 3.

In the case of modulus 11 checks, the sprocket pulley 184 shown in FIG. 22 is provided with eleven projections arranged at equal spaces, and the digit group on the check digit rotary indicator 188 is changed to 0, 1, 2, 3, 4, 5, 6, 7, 8, 9 and *. The digit groups depicted on the code number indicating panels are selected according to the weights used as shown in the Table 4.

TABLE 4

| | Modulus 11 | | | | | | | | | | |
|---|---|---|---|---|---|---|---|---|---|---|---|
| | Check digit | | | | | | | | | | |
| Weight | 0 | 1 | 2 | 3 | 4 | 5 | 6 | 7 | 8 | 9 | * |
| 1 | 0 | | 9 | 8 | 7 | 6 | 5 | 4 | 3 | 2 | 1 |
| 2 | 0 | 5 | | 4 | 9 | 3 | 8 | 2 | 7 | 1 | 6 |
| 3 | 0 | 7 | 5 | | 6 | 2 | 9 | 5 | 1 | 8 | 4 |
| 4 | 0 | 8 | 5 | 2 | | 7 | 4 | 1 | 9 | 6 | 3 |
| 5 | 0 | 2 | 4 | 6 | 8 | | 1 | 3 | 5 | 7 | 9 |
| 6 | 0 | 9 | 7 | 5 | 3 | 1 | | 8 | 6 | 4 | 2 |
| 7 | 0 | 3 | 6 | 9 | 1 | 4 | 7 | | 2 | 5 | 8 |
| 8 | 0 | 4 | 8 | 1 | 5 | 9 | 2 | 6 | | 3 | 7 |
| 9 | 0 | 6 | 1 | 7 | 2 | 8 | 3 | 9 | 4 | | 5 |

Figure 24:
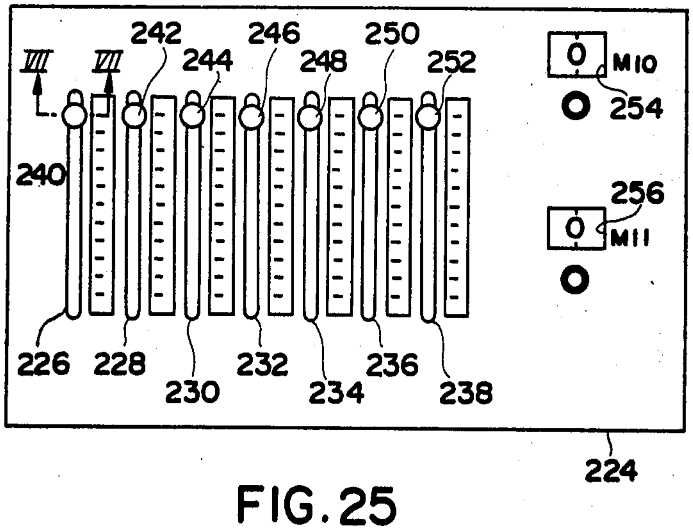
FIG. 24 is a plan view of a calculator case showing a ninth embodiment of the invention in which each check digit is indicated directly.

FIG. 24 shows still another embodiment of the invention directed to a calculator in which both a check digit in a modulus 10 check and a check digit in a modulus 11 check are indicated simultaneously in response to the setting of each code number.

In FIG. 24, a case 224 is formed with slits 226, 228, 230, 232, 234, 236 and 238 in its surface corresponding to the seven digits in each code number, and code number setting knobs 240, 242, 244, 246, 248, 250 and 252 are respectively provided for slidable movement along the slits. Each modulus 10 check digit is indicated at an indicating window 254 and each modulus 11 check digit is indicated at an indicating window 256. However, the code number digit groups used for modulus 10 checks are different from those used for modulus 11 checks.

Figure 25:
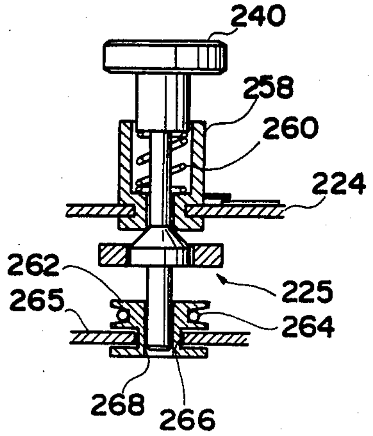
FIG. 25 is a sectional view taken along the line VII—VII of FIG. 24.

Referring to FIG. 25 showing a sectional view taken along the line VII—VII of FIG. 24, the knob 240 is fitted in a guide cylinder 258 through the intermediary of a coiled spring 260, and a moving pulley 262 is provided at the lower end of the knob 240. The moving pulley 262 includes a guide plate 265 fitted in a groove 266 and it is movable along the guide plate 265. A wire 264 is extended to run in the pulley groove of the moving pulley 262. In the illustrated conditions, the movement of the setting knob 240 and the moving pulley 262 is prevented by a knob stopper 225, and when the knob 240 is depressed, the knob 240 is brought out of engagement with the knob stopper 225 so as to permit sliding movement of the moving pulley 262 by the knob 240.

Figure 26:
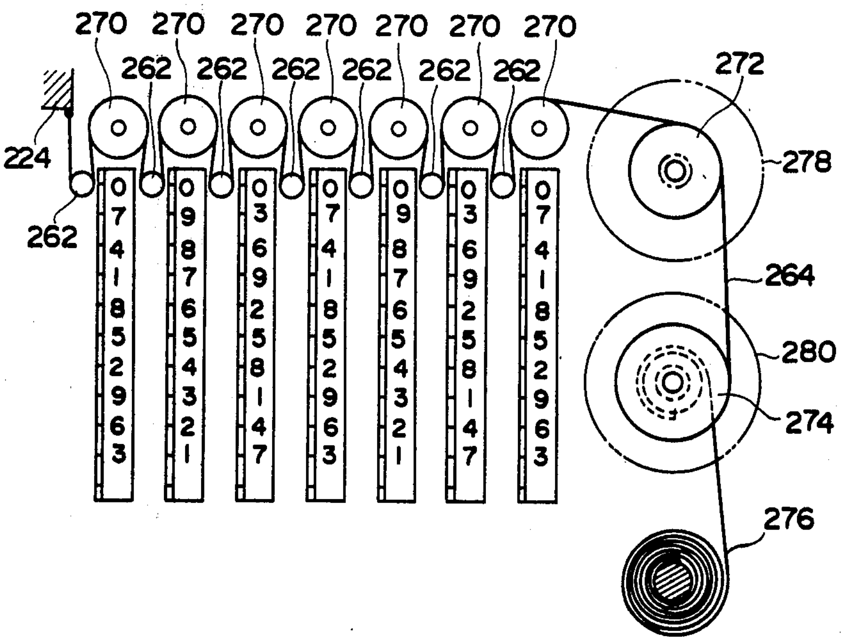
FIG. 26 is a schematic plan view showing the internal construction of the embodiment shown in FIG. 24.
Figure 27:
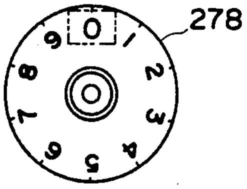
FIG. 27 is a plan view of the modulus 10 check digit rotary indicator used with the embodiment of FIG. 26.
Figure 28:
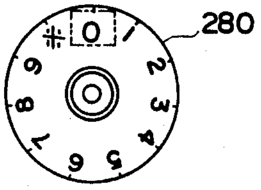
FIG. 28 is a plan view of the modulus 11 check digit rotary indicator used with the embodiment of FIG. 26.

FIG. 26 shows a belt drive unit disposed inside the calculator shown in FIG. 24. Seven units of the moving pulley 262 constructed as shown in FIG. 25 are provided in correspondence with the number of the digits in each code number, and seven idle pulleys 270 are each mounted on a fixed shaft to cooperate with one of the associated moving pulleys 262. Driven pulleys 272 and 274 are each rotatably mounted on a fixed shaft. The drive wire 264 has its one end fastened to the case 224, and after having been successively extended around the moving pulleys 262 and the idle pulleys 270 to form loops and then extended around driven pulley 272 and wound a predetermined number of times around the circumference of the driven pulley 274, the other end of the wire 264 is fastened finally to the driven pulley 274. One end of a constant load spiral spring 276 is wound on and fastened to the driven pulley 274 so as to always bias it in a direction to wind up the drive wire 264. The driven pulley 272 is rotatable without causing slip in response to the movement of the wire 264, and its circumference is so selected that it is rotated 1/10 of a revolution by the movement of the wire 264 caused when the moving pulley 262 is moved by the setting knob a distance corresponding to one digit spacing. On the other hand, the circumference of the driven pulley 274 is so selected that it is rotated 1/11 of a revolution by the movement of the moving pulley 262 corresponding to one digit spacing. Fixedly mounted to the driven pulley 272 is a rotary indicator 278 shown in FIG. 27 which is adapted to indicate the modulus 10 check digits, and fixedly mounted to the driven pulley 274 is a rotary indicator 280 shown in FIG. 28 which is adapted to indicate the modulus 11 check digits.

Figure 29:
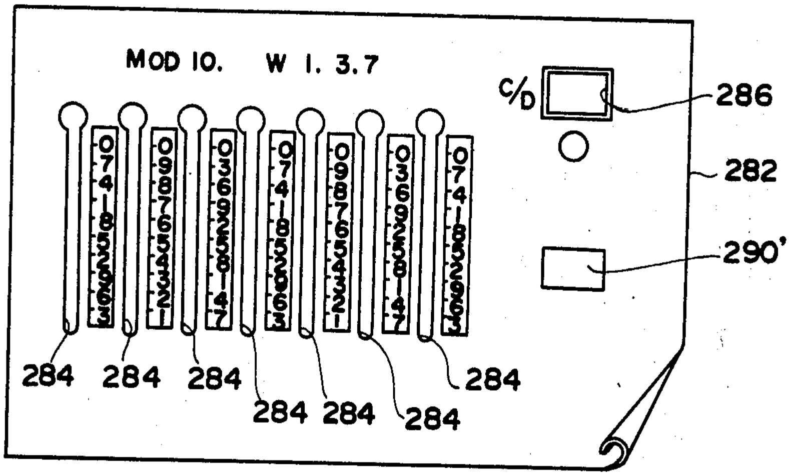
FIG. 29 is a plan view of a code number sheet according to a modulus 10, weights 1, 3, 7 check, which is used by placing it on the calculator case shown in FIG. 24.
Figure 30:
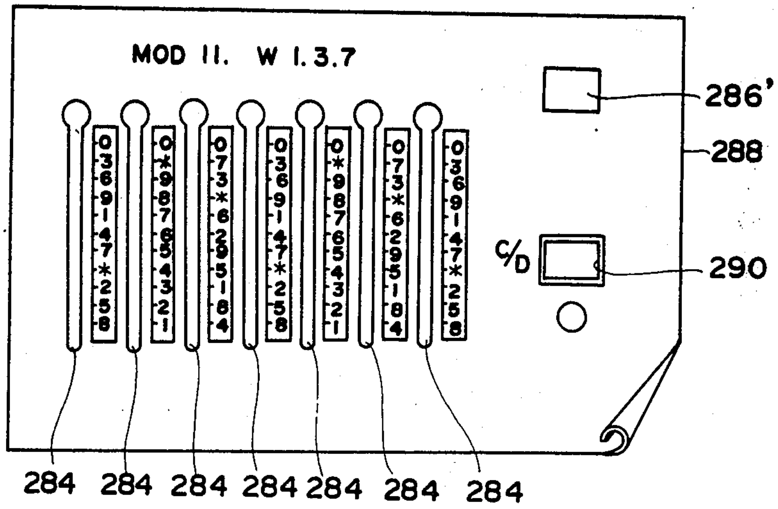
FIG. 30 is a plan view of a code number sheet according to a modulus 11, weights 1, 3, 7 check, which is used by placing it on the calculator case shown in FIG. 24.
Figure 31:
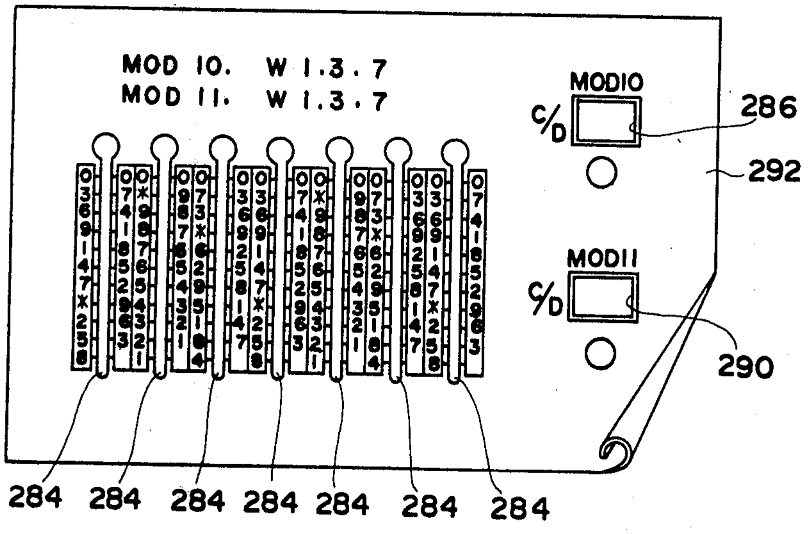
FIG. 31 is a plan view of a code number sheet according to a modulus 10/11, weights 1, 3, 7 check, which is used by placing it on the calculator case shown in FIG. 24.

A code number overlay such as shown in FIGS. 29, 30 or 31 is placed on the surface of the calculator shown in FIG. 24. FIG. 29 shows a code number overlay 282 adapted for use in the modulus 10, weights 1, 3, 7 check, and check digit indicating cutouts 284 and 286 respectively corresponding to the slits 226, 228, 230, 232, 234, 236 and 238 and the indicating window 254 shown in FIG. 24 are formed in the code number overlay 282. The code number digit groups corresponding to the weights 1, 3 and 7 are printed along the cutouts 284 for seven digit positions. FIG. 30 shows another code number overlay 288 adapted for use in the modulus 11, weights 1, 3, 7 check, and it is formed with a cutout 290 corresponding to the indicating window 256 of FIG. 24. In FIGS. 29 and 30 portions 290' and 286' are cut out or made transparent so that when a plurality of the overlays are superposed, the cutouts 286 and 290 will not be hidden. The code number digit groups printed on the code number overlay 288 each correspond to the weight 1, 3 or 7 in Table 4.

A code number overlay 292 shown in FIG. 31 is a combination of the code number overlays shown in FIGS. 29 and 30, in which a modulus 10 code number digit group is printed in red on the right side and a modulus 11 code number digit group is printed in blue on the left side of each cutout 284. This type of code number sheet may be prepared for the Luhn's check and modulus 10 and 11 checks with any other desired weights.

Figure 32:
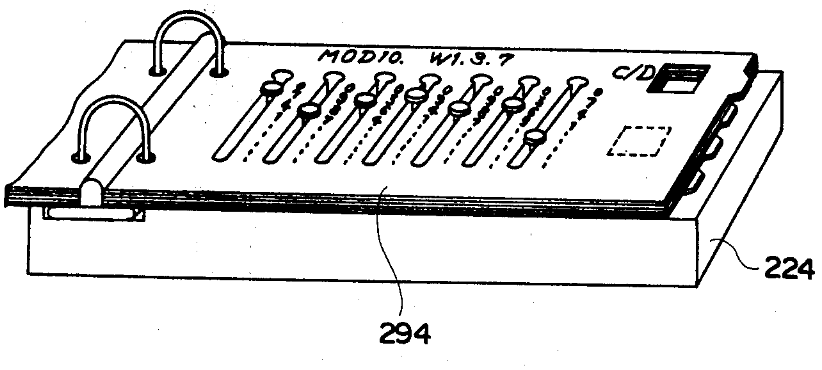
FIG. 32 is a perspective view showing code number sheets filed in the form of a book.

FIG. 32 shows a plurality of code number overlays for different modulus and weights which are filed in the form of a book and set in place on the calculator shown in FIG. 24. By removing the heads of the code number setting knobs, selecting one of the sheets on which are printed the digit groups corresponding to the desired modulus and weights, resetting the heads of the code number setting knobs, and setting a desired code number according to the selected code number overlay, it is possible to indicate the corresponding check digit.

Figure 33:
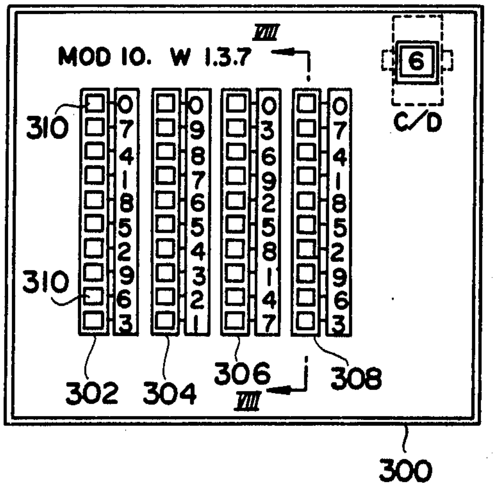
FIG. 33 is a plan view showing a tenth embodiment of the invention, in which each check digit is directly indicated.
Figure 34:
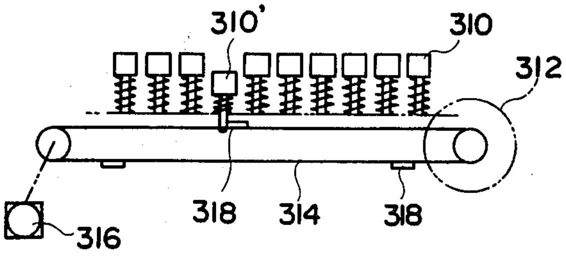
FIG. 34 is a sectional view taken along the line VIII—VIII of FIG. 33.

Referring to FIGS. 33 and 34, a case proper 300 is formed with four vertically extended elongated holes 302, 304, 306 and 308 in its upper surface which are arranged at predetermined spaces, and ten code number setting pushbuttons 310 are mounted in each elongated hole. The pushbuttons 310 are of the double action type, so that the initial depression holds one pushbutton in its depressed position and the depression of another pushbutton returns the previously depressed pushbutton to the initial position. A belt 314 is disposed below each of the elongated holes 302, 304, 306 and 308 so as to separately drive a check digit indicating wheel 312. The plurality of belts 314 are moved by a common motor 316 so as to rotate the check digit indicating wheel 312 through an integrating unit which is not shown. Each belt 314 is provided with stoppers 318. It is so arranged that with one of the pushbuttons 310 being engaged with the stopper, when another pushbutton, e.g., pushbutton 310' is depressed, the previously depressed pushbutton 310 is raised to bring it out of engagement with the stopper 318 and simultaneously the motor 316 is brought into operation. The motor 316 incorporates therein a slide clutch so that when an excessive tension is simultaneously applied to the belts 314 (e.g., when the belts 314 are locked by any pushbuttons), the motor 316 is stopped immediately. FIG. 34 shows a condition in which the belt 314 is locked by the depression of the pushbutton 310'. The digits depicted along the elongated holes 302, 304, 306 and 308 are the same with the code number digit groups used in the embodiment of FIG. 18. As a result, in the modulus 10, weights 1, 3, 7 check the corresponding check digit to a code number 2 is 6. This code number setting requires no initialization, and it is possible to effect not only the correction of erroneous operations but also the continuous calculation of check digits. This is made very easy by the use of the endless belts 314 and their periodicity. It is also possible to arrange so that a reset pushbutton is provided to reset all the digit positions to zero simultaneously.

An advantage of this embodiment is that by simply setting a desired code number through the depression of the pushbuttons, it is possible to readily obtain a check digit corresponding to the set code number.

Thus, a check digit calculator is provided by the invention in which by simply setting a code number, it is possible to indicate the required check digit original numerals from which the desired check digit can be calculated or to directly indicate the desired check digit directly irrespective of the number of the digits in the code number and also the desired check digits corresponding to a selected modulus and weights can be obtained, thus ensuring an improved efficiency for clerical operations involving the handling of slips using code numbers which require the verification or calculation of the associated check digits.

What is claimed is:

1. A check digit calculator for directly indicating code number check digits according to modulus 10 and/or modulus 11, comprising:

code number setting means wherein a plurality of slits are formed in the surface of a calculator case, said slits being equal in number to code number digit groups, a code number digit group is indicated along each of said slits, said digit group corresponding to a predetermined modulus and elected according to the weight of each digit in the code number associated therewith and a code number setting knob is disposed slidably along each of said slits;

check digit indicating means actuated in response to the setting of a desired code number by said code number setting means to indicate a corresponding check digit and comprising modulus 10 and/or modulus 11 check digit rotary indicators;

a plurality of moving pulleys each disposed along each of said slits so as to be slidable by the code number setting knob;

a plurality of idle pulleys provided to cooperate with corresponding moving pulleys;

a first driven pulley fixedly mounted to said modulus 10 check digit rotary indicator;

a second driven pulley fixedly mounted to said modulus 11 check digit rotary indicator;

connecting means for connecting said code number setting knobs with said plurality of moving pulleys; and a wire fastened at one end thereof to the case of said calculator, extended around said moving pulleys and said idle pulleys to form loops, brought into contact with said first driven pulley, wound a plurality of times around said second driven pulley, and fastened at the other end thereof to said driven pulley.

2. The check digit calculator according to claim 1, comprising a spiral spring disposed to bias said second driven pulley in the direction of the winding of said wire.

3. The check digit calculator according to claim 1, wherein said first driven pulley has another periphery of a length selected so that said first driven pulley is rotated 1/10 of a revolution when said wire is moved by said code number setting knob a distance corresponding to the spacing between said code number setting digits and wherein said second driven pulley has an outer periphery of a length selected so that said second driven pulley is rotated 1/11 of a revolution when said wire is moved by said code number setting knob a distance corresponding to one spacing of said code number setting distance.

* * * * *